(12) United States Patent
Shimada et al.

(10) Patent No.: US 7,546,426 B2
(45) Date of Patent: *Jun. 9, 2009

(54) STORAGE HAVING A LOGICAL PARTITIONING CAPABILITY AND SYSTEMS WHICH INCLUDE THE STORAGE

(75) Inventors: Kentaro Shimada, Tokyo (JP); Akiyoshi Hashimoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 103 days.

This patent is subject to a terminal disclaimer.

(21) Appl. No.: 11/642,510

(22) Filed: Dec. 21, 2006

(65) Prior Publication Data
US 2007/0106872 A1    May 10, 2007

Related U.S. Application Data

(63) Continuation of application No. 10/780,772, filed on Feb. 19, 2004, now Pat. No. 7,181,577.

(30) Foreign Application Priority Data
Oct. 23, 2003  (JP) ............................. 2003-362750

(51) Int. Cl.
G06F 12/00  (2006.01)
(52) U.S. Cl. ................... 711/153; 711/113; 711/114; 711/129; 711/130; 711/173
(58) Field of Classification Search ................ None
See application file for complete search history.

(56) References Cited

U.S. PATENT DOCUMENTS

| 5,210,844 | A | 5/1993  | Shimura et al. |
| 5,568,629 | A | 10/1996 | Gentry et al.  |
| 5,592,638 | A | 1/1997  | Onodera        |
| 5,657,470 | A | 8/1997  | Fisherman et al. |
| 5,659,786 | A | 8/1997  | George et al.  |
| 5,704,055 | A | 12/1997 | George et al.  |

(Continued)

FOREIGN PATENT DOCUMENTS

DE         10014448         11/2000

(Continued)

OTHER PUBLICATIONS

Buck, A.L. et al., "The Storage Server as Virtual Volume Manager", IEEE Comput. Soc., Apr. 1993, USA 26-29, pp. 79-86.

(Continued)

*Primary Examiner*—Reginald G Bragdon
*Assistant Examiner*—Eric Loonan
(74) *Attorney, Agent, or Firm*—Mattingly, Stanger, Malur & Brundidge, P.C.

(57) ABSTRACT

A storage includes: host interface units; file control processors which receives a file input/output request and translates the file input/output request into a data input/output request; file control memories which store translation control data; groups of disk drives; disk control processors; disk interface units which connect the groups of disk drives and the disk control processors; cache memories; and inter-processor communication units. The storage logically partitions these devices to cause the partitioned devices to operate as two or more virtual NASs.

18 Claims, 9 Drawing Sheets

U.S. PATENT DOCUMENTS

| | | |
|---|---|---|
| 5,765,153 A | 6/1998 | Benantar et al. |
| 5,790,852 A | 8/1998 | Salm |
| 5,829,053 A | 10/1998 | Smith et al. |
| 5,973,690 A | 10/1999 | Ofer |
| 6,021,481 A | 2/2000 | Eickemeyer et al. |
| 6,148,368 A | 11/2000 | DeKoning |
| 6,247,109 B1 | 6/2001 | Kleinsorge et al. |
| 6,275,824 B1 | 8/2001 | O'Flaherty et al. |
| 6,275,825 B1 | 8/2001 | Kobayashi et al. |
| 6,275,898 B1 | 8/2001 | DeKoning |
| 6,279,046 B1 | 8/2001 | Armstrong et al. |
| 6,289,398 B1 | 9/2001 | Stallmo et al. |
| 6,330,653 B1 | 12/2001 | Murray et al. |
| 6,341,331 B1 | 1/2002 | McNutt |
| 6,343,324 B1 | 1/2002 | Hubis et al. |
| 6,347,358 B1 | 2/2002 | Kuwata |
| 6,425,049 B1 | 7/2002 | Yamamoto et al. |
| 6,438,671 B1 | 8/2002 | Doing et al. |
| 6,457,102 B1 | 9/2002 | Lambright et al. |
| 6,484,173 B1 | 11/2002 | O'Hare et al. |
| 6,484,245 B1 | 11/2002 | Sanada |
| 6,502,162 B2 | 12/2002 | Blumenau et al. |
| 6,502,193 B1 | 12/2002 | Barber |
| 6,507,896 B2 | 1/2003 | Sanada |
| 6,507,905 B1 | 1/2003 | Hubacher et al. |
| 6,519,679 B2 | 2/2003 | Devireddy et al. |
| 6,523,096 B2 | 2/2003 | Sanada |
| 6,542,926 B2 | 4/2003 | Zalewski et al. |
| 6,542,961 B1 | 4/2003 | Matsunami |
| 6,594,775 B1 | 7/2003 | Fair |
| 6,606,690 B2 | 8/2003 | Padovano |
| 6,606,695 B2 | 8/2003 | Kamano |
| 6,609,180 B2 | 8/2003 | Sanada |
| 6,615,324 B1 | 9/2003 | Fernald |
| 6,640,278 B1 | 10/2003 | Nolan et al. |
| 6,665,786 B2 | 12/2003 | McMichael et al. |
| 6,684,209 B1 | 1/2004 | Ito et al. |
| 6,690,400 B1 | 2/2004 | Moayyad et al. |
| 6,691,209 B1 | 2/2004 | O'Connell |
| 6,701,410 B2 | 3/2004 | Matsunami |
| 6,701,411 B2 | 3/2004 | Matsunami |
| 6,715,031 B2 | 3/2004 | Camble et al. |
| 6,718,481 B1 | 4/2004 | Fair |
| 6,725,352 B2 | 4/2004 | Goodman et al. |
| 6,728,836 B1 | 4/2004 | Lambright et al. |
| 6,728,844 B2 | 4/2004 | Sanada |
| 6,738,854 B2 | 5/2004 | Hoese et al. |
| 6,742,034 B1 | 5/2004 | Schubert et al. |
| 6,742,090 B2 | 5/2004 | Sanada et al. |
| 6,754,776 B2 | 6/2004 | Conway et al. |
| 6,763,419 B2 | 7/2004 | Hoese et al. |
| 6,772,287 B2 | 8/2004 | Uchiyama et al. |
| 6,839,796 B2 | 1/2005 | Dawson et al. |
| 6,851,022 B2 | 2/2005 | Ikeuchi et al. |
| 6,851,029 B2 | 2/2005 | Matsunami |
| 6,865,157 B1 | 3/2005 | Scott |
| 6,877,073 B2 | 4/2005 | Sanada |
| 6,898,672 B2 | 5/2005 | Lambright et al. |
| 6,904,470 B1 | 6/2005 | Ofer |
| 6,910,102 B2 | 6/2005 | Matsunami |
| 2001/0008010 A1 | 7/2001 | Sanada |
| 2001/0011333 A1 | 8/2001 | Sanada |
| 2001/0020254 A1 | 9/2001 | Blumenau et al. |
| 2001/0027501 A1 | 10/2001 | O'Hare et al. |
| 2001/0047463 A1 | 11/2001 | Kamano |
| 2001/0047482 A1 | 11/2001 | Harris et al. |
| 2002/0007366 A1 | 1/2002 | Fontijn |
| 2002/0010811 A1 | 1/2002 | Arndt et al. |
| 2002/0010843 A1 | 1/2002 | Sanada |
| 2002/0016812 A1 | 2/2002 | Uchishiba et al. |
| 2002/0052914 A1 | 5/2002 | Zalewski et al. |
| 2002/0065982 A1 | 5/2002 | Colligan |
| 2002/0083285 A1 | 6/2002 | Sanada |
| 2002/0091898 A1 | 7/2002 | Matsunami |
| 2002/0095549 A1 | 7/2002 | Matsunami |
| 2002/0095602 A1 | 7/2002 | Pherson et al. |
| 2002/0099837 A1 | 7/2002 | Oe et al. |
| 2002/0099914 A1 | 7/2002 | Matsunami |
| 2002/0103913 A1 | 8/2002 | Tawil et al. |
| 2002/0104008 A1 | 8/2002 | Cochran et al. |
| 2002/0107810 A1 | 8/2002 | Nishio et al. |
| 2002/0124040 A1 | 9/2002 | Foster et al. |
| 2002/0133539 A1 | 9/2002 | Monday |
| 2002/0161891 A1 | 10/2002 | Higuchi et al. |
| 2002/0178143 A1 | 11/2002 | Fujimoto |
| 2003/0005456 A1 | 1/2003 | Naganuma et al. |
| 2003/0009648 A1 | 1/2003 | Doing et al. |
| 2003/0014600 A1 | 1/2003 | Ito et al. |
| 2003/0023868 A1 | 1/2003 | Parent |
| 2003/0055933 A1 | 3/2003 | Ishizaki et al. |
| 2003/0055972 A1 | 3/2003 | Fuller et al. |
| 2003/0065898 A1 | 4/2003 | Flamma et al. |
| 2003/0084241 A1 | 5/2003 | Lubbers et al. |
| 2003/0097393 A1 | 5/2003 | Kawamoto et al. |
| 2003/0110263 A1 | 6/2003 | Shillo |
| 2003/0115218 A1 | 6/2003 | Bobbitt et al. |
| 2003/0115282 A1 | 6/2003 | Rose |
| 2003/0115434 A1 | 6/2003 | Mahalingam et al. |
| 2003/0115438 A1 | 6/2003 | Mahalingam et al. |
| 2003/0115447 A1 | 6/2003 | Pham et al. |
| 2003/0120743 A1 | 6/2003 | Coatney |
| 2003/0120751 A1 | 6/2003 | Husain et al. |
| 2003/0131182 A1 | 7/2003 | Kumar et al. |
| 2003/0140051 A1 | 7/2003 | Fujiwara et al. |
| 2003/0177176 A1 | 9/2003 | Hirschfeld et al. |
| 2003/0182501 A1 | 9/2003 | George et al. |
| 2003/0191910 A1 | 10/2003 | Matsunami |
| 2003/0196055 A1 | 10/2003 | Kamano et al. |
| 2003/0225934 A1 | 12/2003 | Kaji |
| 2003/0229698 A1 | 12/2003 | Furuhashi |
| 2004/0003063 A1 | 1/2004 | Ashok et al. |
| 2004/0010563 A1 | 1/2004 | Forte et al. |
| 2004/0049564 A1 | 3/2004 | Ng et al. |
| 2004/0064729 A1 | 4/2004 | Yellepeddy |
| 2004/0088417 A1 | 5/2004 | Bober et al. |
| 2004/0111557 A1 | 6/2004 | Nakatani et al. |
| 2004/0111580 A1 | 6/2004 | Weber et al. |
| 2004/0111596 A1 | 6/2004 | Rawson, III |
| 2004/0139168 A1 | 7/2004 | Tanaka et al. |
| 2004/0153605 A1 | 8/2004 | Nakamura |
| 2004/0153710 A1 | 8/2004 | Fair |
| 2004/0158673 A1 | 8/2004 | Matsunami |
| 2004/0163028 A1 | 8/2004 | Olarig |
| 2004/0168033 A1 | 8/2004 | Sanada |
| 2004/0181589 A1 | 9/2004 | Suleiman |
| 2004/0193803 A1 | 9/2004 | Mogi et al. |
| 2004/0199736 A1 | 10/2004 | Kamano |
| 2004/0210591 A1 | 10/2004 | Hirschfeld et al. |
| 2004/0212511 A1 | 10/2004 | Ahrens et al. |
| 2004/0215859 A1 | 10/2004 | Armstrong et al. |
| 2004/0215860 A1 | 10/2004 | Armstrong et al. |
| 2004/0215915 A1 | 10/2004 | Block et al. |
| 2005/0005064 A1 | 1/2005 | Ito et al. |
| 2005/0010722 A1 | 1/2005 | Chen |
| 2005/0015546 A1 | 1/2005 | Zohar et al. |
| 2005/0021727 A1 | 1/2005 | Matsunami |
| 2005/0033914 A1 | 2/2005 | Matsunami |
| 2005/0050085 A1 | 3/2005 | Shimada et al. |
| 2005/0071446 A1 | 3/2005 | Graham et al. |
| 2005/0120171 A1 | 6/2005 | Yasukawa et al. |
| 2005/0149677 A1 | 7/2005 | Shimada et al. |
| 2005/0166074 A1 | 7/2005 | Hack |

| | | | |
|---|---|---|---|
| 2005/0172052 A1 | 8/2005 | Sanada | |

FOREIGN PATENT DOCUMENTS

| | | |
|---|---|---|
| EP | 1 089 173 | 4/2001 |
| EP | 1321848 | 12/2002 |
| EP | 1341074 | 9/2003 |
| JP | 5-128002 | 5/1993 |
| JP | 2000-215071 | 8/2000 |
| JP | 2001-184294 | 7/2001 |
| JP | 2002-149599 | 5/2002 |
| JP | 2002-230189 | 8/2002 |
| JP | 2002-259214 | 9/2002 |
| JP | 2003/30053 | 1/2003 |
| JP | 2003-157177 | 5/2003 |
| JP | 2003-216474 | 7/2003 |
| JP | 2005-128733 | 5/2005 |
| WO | 02/35359 | 5/2002 |

OTHER PUBLICATIONS

Gelb, J. P., "System-Managed Storage", IBM Systems Journal, vol. 28, No. 1, Jan. 1989, pp. 77-103.

Kaczmarski, M. et al., "Beyond Backup Toward Storage Management", IBM Systems Journal, vol. 42, No. 2, 2003, pp. 322-337.

"Freedom Storage Lightning 9900 V Series", User and Reference Guide, Hitachi Data Systems Corp., 2002, pp. iii-124.

Swartz, K., "Multiple Volumes and Multiple RAID Groups on NetApp Fliers", Network Appliance Report TR 3027, no date, from Google cache online.

Rangel, G., "Hitachi Freedom Storage: Thunder 9200 Architecture and Performance Configuration Guidelines", Hitachi Data Systems, 2001, pp. 1-27.

B.W. Lampson, "Protection" Operating Systems Review, ACM Press, XX, vol. 8, No. 1, Jan. 1974, pp. 18-24.

Backup Media Toshiteno Network Storage, Professional DTP 2003, Japan, Kogaku-sha Co., Ltd., Oct. 21, 2003, (accession date), Nov. issue, pp. 92-93.

FIG.2

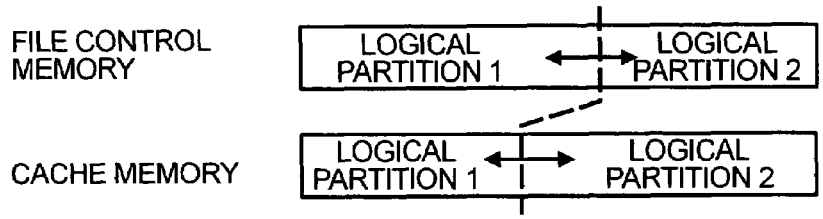

|  | IMPORTANCE IS ATTACHED TO READ DATA TRANSFER RATE | IMPORTANCE IS ATTACHED TO RESPONSE TIME | LARGE AREA RANDOM ACCESS | SEQUENTIAL ACCESS |
|---|---|---|---|---|
| FILE CONTROL MEMORY | ALLOCATION SMALL | ALLOCATION LARGE | ALLOCATION SMALL | ALLOCATION LARGE |
| CACHE MEMORY | ALLOCATION LARGE | ALLOCATION SMALL | ALLOCATION SMALL | ALLOCATION LARGE |

FIG.3

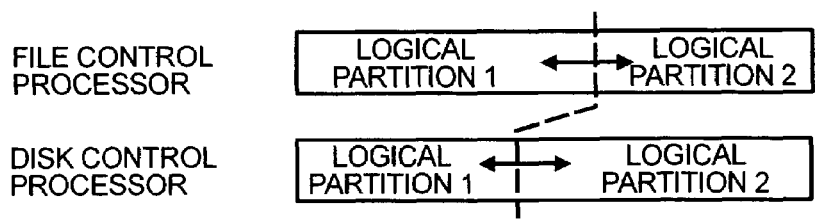

|  | SMALL NUMBER OF LARGE FILE ACCESS | LARGE NUMBER OF SMALL FILE ACCESS | NOT REQUIRED HIGH PERFORMANCE | REQUIRED HIGH PERFORMANCE |
|---|---|---|---|---|
| FILE CONTROL PROCESSOR | ALLOCATION SMALL | ALLOCATION LARGE | ALLOCATION SMALL | ALLOCATION LARGE |
| DISK CONTROL PROCESSOR | ALLOCATION LARGE | ALLOCATION SMALL | ALLOCATION SMALL | ALLOCATION LARGE |

FIG.9

|  | LOGICAL PARTITION 1 | LOGICAL PARTITION 2 | LOGICAL PARTITION 3 | NOT ALLOCATED YET |
|---|---|---|---|---|
| FILE CONTROL PROCESSOR 1 | 100% | 0% | 0% | 0% |
| FILE CONTROL PROCESSOR 2 | 0% | 50% | 50% | 0% |
| FILE CONTROL PROCESSOR 3 | 0% | 0% | 0% | 100% |
| DISK CONTROL PROCESSOR 1 | 100% | 0% | 0% | 0% |
| DISK CONTROL PROCESSOR 2 | 0% | 100% | 0% | 0% |
| DISK CONTROL PROCESSOR 3 | 0% | 0% | 100% | 0% |
| FILE CONTROL MEMORY | 4GB | 5GB | 7GB | 2GB |
| CACHE MEMORY | 64GB | 96GB | 96GB | 0GB |
| HOST INTERFACE UNIT | H00 H01 H02 H03 | H04 H05 H06 H07 | H08 H09 H0A H0B | H0C |
| INTER-PROCESSOR COMMUNICATION | 40% | 25% | 35% | 0% |
| DISK DRVE | 400GB/RAID5(DR#1,2,3,4)/7.5kRPM<br>400GB/RAID5(DR#5,6,7,8)/7.5kRPM<br>200GB/RAID5(DR#9,10,11,12)/7.5kRPM<br>200GB/RAID5(DR#13,14,15,16)/7.5kRPM | 300GB/RAID1(DR#21,22)/15kRPM<br>300GB/RAID1(DR#23,24)/15kRPM<br>300GB/RAID1(DR#25,26)/15kRPM | 300GB/RAID1(DR#31,32)/7.5kRPM<br>300GB/RAID1(DR#33,34)/7.5kRPM<br>300GB/RAID1(DR#35,36)/7.5kRPM<br>300GB/RAID1(DR#37,38)/7.5kRPM |  |

STORAGE HAVING A LOGICAL PARTITIONING CAPABILITY AND SYSTEMS WHICH INCLUDE THE STORAGE

This application is a continuation application of U.S. application Ser. No. 10/780,772, filed Feb. 19, 2004, now U.S. Pat. No. 7,181,577, the entirety of which is incorporated herein by reference.

BACKGROUND OF THE INVENTION

1. Field of the Invention

The present invention relates to a storage which is connected to a network and used, in particular to a NAS.

2. Description of the Related Art

As a method of improving performance of an information processing system, the number of computers provided in the information processing system is simply increased. However, if a large number of computers are used, considerable time and labor are required for supervision of the respective computers, and a total area for installing the computers and total power consumed by the computers increase considerably. In order to solve this problem, there has been devised a technique for setting a high performance computer, logically partitioning resources of the computer into plural sections, and using the respective partitioned sections as a virtual computer independently. This is called logical partitioning (LPAR) of a computer. For example, an example of such a logical partitioning technique is disclosed in JP-A-2003-157177 (corresponding US Patent Publication No. 2003/0097393).

By virtualizing one computer look as if it is functioning as a large number of computers according to the logical partitioning, a flexible operation becomes possible. For example, various operating systems can be used on the respective virtual computers freely and boot up and shutdown or failure management can be performed independently for each virtual computer. In addition, the number of physical machines is small, which is advantageous in terms of system management, an installation area for the machines, power consumption thereof, and the like. However, in the LPAR in the conventional computer, although resources such as a processor and a memory in a computer are logically partitioned and allocated to the respective virtual computers, concerning a storage connected to the computer, a storage area provided in the storage is simply partitioned and the partitioned storage areas are allocated to the virtual computers, respectively. Nothing is further taken into account specifically.

On the other hand, as a form of using a storage, other than a form in which the storage is directly connected to one computer (hereinafter referred to as "host" in some cases) and used, there is a form in which the storage is shared by plural computers via a network. In the latter form, in particular, as storage which has an interface as a form of a file system, that is, to which file access is possible from the computers, is called a network attached storage (hereinafter referred to as "NAS").

Data is exchanged between the NAS and the hosts by a form of file having a name and a structure which are recognized by an operating system running on the host. Therefore, in addition to a disk drive for storing data and a control unit therefor, the NAS has a processor and a memory, which are used for translating file input/output to and from the host into data input/output to and from the disk drive.

SUMMARY OF THE INVENTION

The NAS is originally based upon an idea that it is more advantageous to provide a storage shared over a network than to set a storage individually for plural hosts. Thus, the NAS itself has to perform control for sharing a storage area or the like among the plural hosts. In addition, when a certain hosts reads and writes a large quantity of data, almost the entire processing ability of the NAS is consumed, and ability for inputting and outputting data to and from the other hosts declines. Moreover, when data destruction or failure of the NAS occurs due to an operation mistake of the like of a certain host, the data destruction or failure may affect data used by the other hosts.

It is an object of the present invention to reduce control for sharing when the NAS is shared by plural hosts and eliminate mutual interference among the hosts so as to guarantee ability of input/output and localize data destruction or failure. In addition, it is another object of the present invention to improve a usability of resources such a processor and a memory in the NAS.

In order to attain the above-mentioned objects, logical partitioning is performed in the NAS. More specifically, there is provided a storage which is connected to a network and receives file access, in which resources held by the storage, for example, disk drives, interfaces with the network, processors controlling file access, and the like are logically partitioned by a control unit provided in the storage to enable respective logical partitions (virtual storages) to operate independently.

Further, it is also possible that the control unit has plural processors and these processors divides the logical partitioning or performs the logical partitioning as a whole.

Moreover, the control unit may have a supervising terminal to input information necessary for logical partitioning from this supervising terminal. In this case, it is also possible that only an access characteristic of a computer using the storage are inputted to the supervising terminal, and the supervising terminal calculates information necessary for logical partitioning from the access characteristic and communicates the information to the storage.

Moreover, a computer using the storage may also function as a supervising terminal.

BRIEF DESCRIPTION OF THE DRAWINGS

In the accompanying drawings:

FIG. 2 is a diagram showing an example of allocation of a file control memory and a cache memory;

FIG. 3 is a diagram showing an example of allocation of a file control processor and a disk control processor;

FIG. 9 is a diagram of showing an example of logical partitioning information of respective resources of the NAS;

DESCRIPTION OF THE PREFERRED EMBODIMENTS

Embodiments of the present invention will be hereinafter described with reference to the accompanying drawings. Note that it is needless to mention that the present invention is not limited to descriptions of the embodiments described below.

Figure 1:
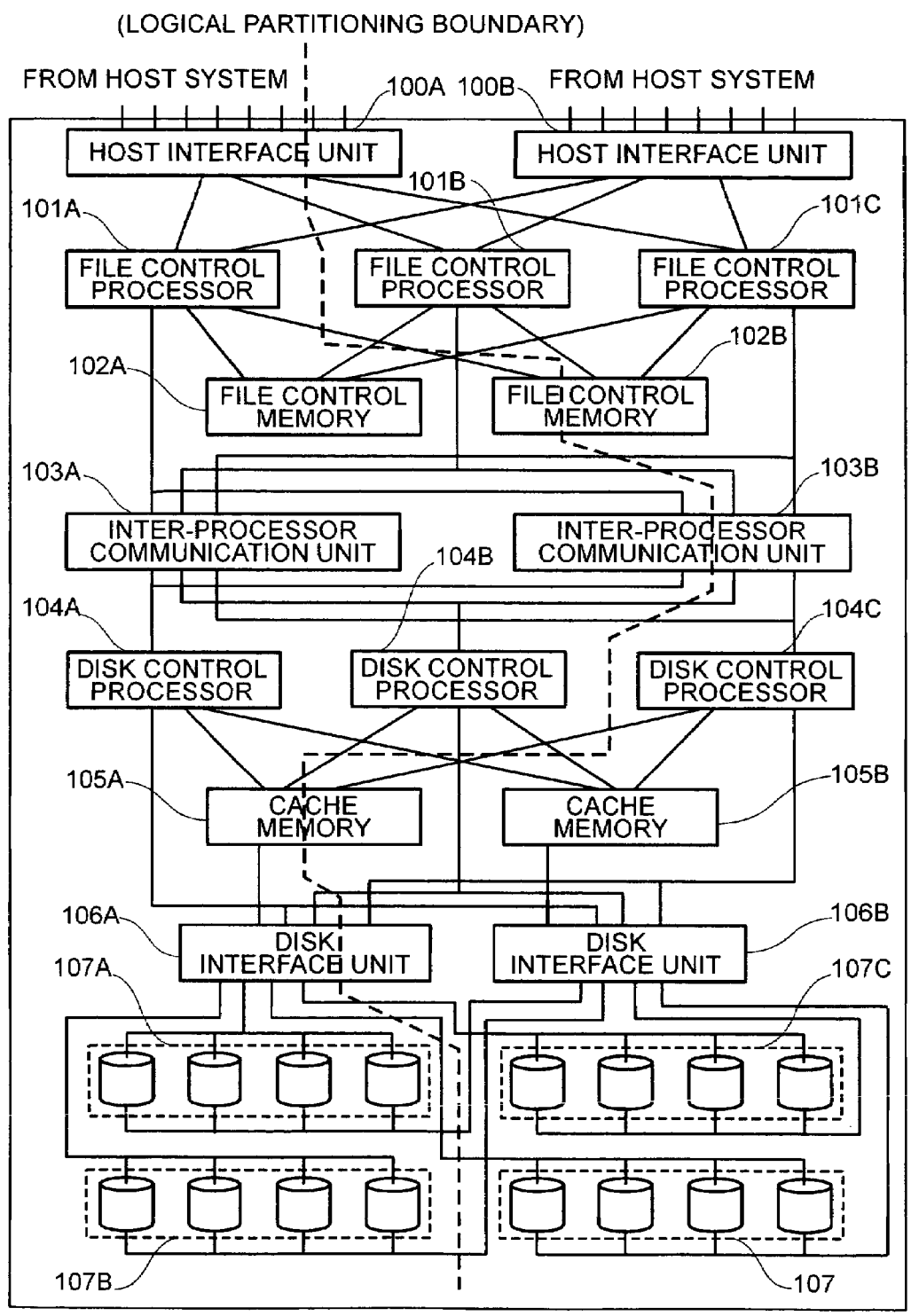
FIG. 1 is a diagram showing an example of a structure of a NAS.

FIG. 1 is a diagram showing an example of an embodiment of a NAS to which the present invention is applied. The NAS includes: two host interface units 100 which are connected to a host (hereinafter also referred to as "host system"); three file control processors 101 which translate an input/output request by a unit of file from the host into an input/output request of data by a unit of block; two file control memories 102 which store information necessary for translating an input/output request by a form of file into an input/output request of data by a unit of block (hereinafter also referred to as "translation control data"); four groups of disk drives 107 serving as storage media; three disk control processors 104 which control input/output of data to and from the groups of disk drives 107; two cache memories 105 which temporarily store data inputted to or outputted from the groups of disk drives 107; two disk interface units 106 which connect the disk control processors 104 and the group of disk drives 107; and two inter-processor communication units 103 which connect the disk control processors 104 and the file control processors 101.

Here, it is also possible that plural disk drives are included in the groups of disk drives 107 and each group takes a RAID configuration. In addition, the "block" is a predetermined unit which is used when the disk control processors 104 store data in disk drives. In general, 512B is adopted as the block. In addition, the "translation control data" is information indicating a correspondence relation between a file name used in a file system and a position of a file from its top, and the block. In general, the translation control data is expressed as a link structure such as I-Node or a data structure such as an address translation table.

Note that, in this specification, identical devices are denoted by identical reference numerals, and alphabets such as "a" and "b" are attached to identical reference numerals when the identical devices are distinguished. In addition, the above-mentioned numbers of the respective devices are only examples and do not limit the present invention.

In FIG. 1, an input/output request by a unit of file, which is sent from the host system to the NAS, is processed in the NAS as described below.

First of all, a request for starting file reference (open) designating a file name is sent to the NAS from the host. Next, an actual input/output request for data is sent, and finally, a request for ending file reference (close) is sent.

These requests are received by any one of the host interface units 100 and transferred to any one of the file control processors 101. The file control processor 101 checks the file name requested by the host with reference to the translation control data stored in the file control memories 102, records the file name started to be used, and translates a data input/output request for the file into a data input/output request to the group of disk drives 107 in which the data is stored.

The translated data input/output request is sent to any one of the disk control processors 104 via any one of the inter-processor communication units 103. In addition, in the case in which necessary translation control data is not stored in the file control memories 102, the file control processor 101 requests translation control data stored in a predetermined storage area of the groups of disk drives 107 from any one of the disk control processors 104 via the inter-processor communication unit 103.

With respect to the data input/output request (including a request for translation control data) received from the any one of the file control processors 101 via the inter-processor communication unit 103, the disk control processor 104 checks if the data is stored in any one of the cache memories 105. When the data is stored in any one of the cache memories 105, the disk control processor 104 applies writing or reading of the requested data to the cache memory 105.

Thereafter, in the case of writing, the disk control processor 104 returns a result to the effect that writing is completed, or in the case of reading, returns a result to the effect that reading is completed together with the read-out data to the file control processor 101, which sent the input/output request, via the inter-processor communication unit 103. The file control processor 101 processes the returned result and data and sends the result (data, a report on completion of processing, etc.) to the host system, which sent the input/output request to the NAS, via the host interface unit 100 which received the input/output request.

On the other hand, in the case in which the data requested by the file control processor 101 is not stored in all the cache memories 105, the disk control processor 104 specifies in which portion of the group of disk drives 107 the requested data is stored, reads out the data from the portion of the groups of disk drives 107 via one of the disk interface units 106, and stores the data in one of the cache memories 105.

Thereafter, the disk control processor 104 applies reading or writing of the requested data to the cache memory 105 in which the data is stored. The subsequent processing is the same as the processing described above.

Note that the data stored in the cache memory 105 is written back to the groups of disk drives 107, for example, when a fixed time has elapsed or when a free space of the cache memory 105 becomes insufficient.

In this embodiment, for example, the above-mentioned kinds of processing are performed independently from each other according to a unit (logical partition) partitioned by a logical partition boundary as shown in FIG. 1. When the host interface units 100, the file control processors 101, the file control memories 102, the inter-processor communication units 103, the disk control processors 104, the cache memories 105, the disk interface units 106, and the groups of disk drives 107, which are physical resources for processing allocated to the respective logical partitions, are allocated to each logical partition. More specifically, a file control processor 101a and a disk control processor 104c, which are allocated to different logical partitions in FIG. 1, do not exchange input/output request of data as described above.

In addition, resource (e.g., file control memory 102b), which are shown across the logical partition boundaries in FIG. 1, are used for each logical partition boundary with a capacity or the like thereof logically partitioned at a rate allocated in advance. In this way, the logical partitions operate as virtual NASs independent from each other.

The processing for partitioning and allocating physical resources to the respective logical partitions is actually executed by the file control processors 101 and the disk control processors 104. As a method of controlling logical partitioning, two methods described below are conceivable.

In a first method, the file control processors 101 and the disk control processors 104 divide the control for the logical partitioning of several physical resources and control the logical partitioning in association with each other as a whole.

For example, the file control processors 101 perform processing for allocating the host interface units 100, the file control processors 101, and the file control memories 102. This processing is hereinafter referred to as "file control hypervisor".

In addition, the disk control processors 104 perform processing for allocating the inter-processor communication units 103, the disk control processors 104, the cache memories 105, the disk interface units 106, and the groups of disk drives 107. This processing is hereinafter referred to as "disk control hypervisor". The file control hypervisor executed by the file control processors 101 and the disk control hypervisor executed by the disk control processors 104 cooperate with each other to perform the each allocation processing. Details of cooperation will be described later. Note that that the file control hypervisor may be executed by any one of the file control processors 101, for example, the file control processors 101a or may be executed by plural file control processors 101, for example, the file control processors 101a and 101b. This is also true for the disk control hypervisor.

In a second method, the two kinds of control processors cooperate to control logical partitioning of all the physical resources. More specifically, all the file control processors 101a to 101c and the disk control processors 104a to 104c perform processing for allocating logical partitions of all the resources of the NAS (integrated hypervisor).

More specifically, for example, hypervisor operating on each processor realizes the logical partitioning as described below.

First, the hypervisor makes resources other than IO processing resources in a logical partition, to which each processor is allocated, invisible for basic IO processing software (BIOS) running on the processor. For example, in FIG. 1, the file control processor 101a is physically connected to the host interface unit 100b. However, in the case in which the logical partition is set to be partitioned by an illustrated dotted line, the hypervisor makes the host interface unit 100b invisible.

More specifically, in the case in which a privileged instruction for checking resources connected to the processor and available resources is executed in a BIOS, the hypervisor generates interrupt in terms of software according to execution of the privileged instruction to shift the execution to the hypervisor. The hypervisor checks resources allocated to a logical partition to which the processor belongs, sets a result of the privileged instruction such that only resources allocated to the logical partition are visible, and returns to the BIOS in which the interrupt was generated.

In this way, each processor handles only resources of a logical partition to which the processor belongs, and separation of logical partitions is realized.

There are two kinds of memories, the host interface units 100 and the inter-processor communication units 103, which are provided with plural communication channels, among the resources. In such a case, it is sufficient to control an amount of resources to be shown to the processors in the respective logical partitions (in the case of the memory, capacities of the memory in a start physical address and an end physical address, and in the case of the communication channel, the number of channels indicated by a set of physical numbers of channels).

In addition, concerning the processor itself, in the case in which each processor is allocated to one logical partition completely, it is sufficient to occupy the processor with the logical partition.

On the other hand, it is also conceivable to allocate one certain processor to two or more logical partitions and cause the logical partitions to share the processor by determining their sharing ratios. In such a case, it is conceivable to implement timer interrupt in each processor in terms of hardware to make arrangement such that the hypervisor is started up at each fixed time by the timer interrupt.

The hypervisor started up by the timer interrupt measures to which extent processing of a logical partition has been performed by the processor, determines a logical partition to be processed next in accordance with the predetermined sharing ratios, and shifts the execution of the processor to processing of the logical partition. In this way, one processor can be partitioned at predetermined rations and allocated to two or more logical partitions.

Note that, as a method of realizing the hypervisor, other than the above-mentioned example, for example, it is also possible to provide special purpose hardware which is connected to the respective processors and performs resource supervision, a special purpose co-processor which is controlled by a small-sized micro program, and the like to realize the control of logical partitioning.

In addition, information on logical partition, for example, information designating a processor, a memory, a communication unit, and the like used in a logical partition 1, is stored in any one or more of the file control memories 102, the cache memories 105, the disk drives of the groups of disk drives 107, or the other storages. Each kind of hypervisor reads out the information to thereby apply designation of logical partitioning to the BIOS or the like. Note that this information is set via a supervising terminal to be described later.

Concerning the hypervisor realized as described above, in the case in which the file control hypervisor is operated by the file control processor and the disk control hypervisor is operated by the disk control processor, the file control hypervisor performs the processing for allocating the host interface units 100, the file control processors 101, and the file control memories 102, the disk control hypervisor performs the processing for allocating the inter-processor communication units 103, the disk control processors 104, the cache memories 105, the disk interface units 106, and the groups of disk drives 107, and the two kinds of hypervisor are associated with each other.

More specifically, in designating logical partitioning with a supervising terminal to be described later, designation applied to logical partitioning with respect to the file control hypervisor and designation applied to logical partitioning with respect to the disk control hypervisor are performed in association with each other. Alternatively, depending upon a manner of designation with respect to logical partitioning, as described later, the file control hypervisor and the disk control hypervisor are adapted to automatically make adjustment each other such that a logical partition conforms to a request for the designated logical partitioning.

In the case of integrated hypervisor, for example, respective processors starting up the integrated hypervisor share information on allocation of all resources to respective logical partitions, the hypervisor determines resources to be used by a processor, which has started up the hypervisor, with reference to the allocation information and executes allocation processing.

Next, a specific example of allocation of the resources of the NAS to logical partitions will be described. The allocation of the resources will be hereinafter described with the case in which the NAS shown in FIG. 1 is logically partitioned into two logical partitions (logical partition 1 and logical partition 2) as an example. However, any number of logical partitions will do. In addition, in the following description, the file control hypervisor and the disk control hypervisor are described as performing logical partitioning in association with each other. However, logical partitioning may be performed by the integrated hypervisor. Moreover, as a matter of expression, if the hypervisor is actually executed by a processor which performs processing of each hypervisor.

FIG. 2 is a diagram showing an example of allocation of the file control memory 102 and the cache memory 105 to logical partitions. For example, when a request of a host system using the logical partition 1 attaches importance to a read data transfer rate, the disk control hypervisor increases an amount of allocation of the cache memory 105 to the logical partition 1 such that requested data is stored in the cache memory 105 as much as possible. In this case, an amount of allocation of the file control memory 102 to the logical partition 1 may be small.

In association with the above, the file control hypervisor decreases the amount of allocation of the file control memory 102 to the logical partition 1 to allocate a larger storage capacity to the logical partition 2. Consequently, it is possible to improve utilization of the file control memory 102 in the NAS as a whole.

On the other hand, if a request of the host system using the logical partition 1 attaches importance to a response time, the file control hypervisor allocates a larger storage capacity of the file control memory 102 to the logical partition 1 such that translation control data is stored in the file control memory 102 as much as possible. In this case, the amount of cache memory 105 allocated to the logical partition 1 may be small. Consequently, the disk control hypervisor can allocate a larger capacity of the cache memory 105 to the logical partition 2, and it is possible to improve utilization of the cache memory 105 in the NAS as a whole.

In addition, in the case in which an input/output request of the host system using the logical partition 1 mainly concerns random access to data scattered in a large area of the group of disk drives 107 provided in the NAS, it is difficult to store all pieces of information on the access scattered in a large area even if large capacities of the file control memory 102 and the cache memory 105 is allocated to the logical partition 1. Thus, an effect of the allocation is small. Therefore, in such a case, the file control hypervisor and the disk control hypervisor reduce the amounts of allocation of the file control memory 102 and the cache memory 105 to the logical partition 1 and allocate a large storage capacity to the logical partition 2 which is the other logical partition to thereby improve a utilization of the cache memory 105 and the like.

Conversely, in the case in which an input/output request of the host system using the logical section 1 mainly concerns sequential access to data stored in continuous ranges of the groups of disk drives 107 provided in the NAS, it is possible to specify in advance information necessary for access and data to be read in advance in the NAS itself. Therefore, it is conceivable that the file control hypervisor and the disk control hypervisor perform allocation processing to increase amounts of allocation of the file control memory 102 and the cache memory 105 to the logical partition 1 such that the information and the data can be stored in the file control memory 102 and the cache memory 105 sufficiently.

FIG. 3 is a diagram showing an example of allocation of the file control processor 101 and the disk control processor 104 to logic partitions.

In the case in which an input/output request from a host system using the logical partition 1 is a request for a small number of large file accesses, an amount of processing for translating file input/output executed by the file control processor 101 into data input/output is not so large. Therefore, an amount of allocation of the file control processor 101 to the logical partition 1 may be small.

In this case, the file control hypervisor reduces the amount of allocation of the file control processor 101 to the logical partition 1 (more specifically, an occupation ratio of the processor) and allocates relatively a larger amount of processor resources than that of the logical partition 1 to the logical partition 2 which is the other logical partition. Consequently, it becomes impossible to improve a utilization of the file control processor 101 provided in the NAS.

In addition, in this case, since an amount of data of a file is large, an amount of processing of data input/output executed by the disk control processor 104 allocated to the logical partition 1 increases. Therefore, the disk control hypervisor increases an amount of allocation of the disk control processor 104 to the logical partition 1.

Further, in the case in which an input/output request of the host system using the logical partition 1 is a request for a large number of small file accesses, an amount of processing for translating file input/output executed by the file control processor 101 into data input/output increases. Thus, the file control hypervisor increases an amount of allocation of the file control processor 101 to the logical partition 1.

In this case, since an amount of data of a file is small in itself, an amount of processing for data input/output executed by the disk control processor 104 allocated to the logical partition 1 is not so large. Thus, the disk control hypervisor reduces the amount of allocation of the disk control processor 104 to the logical partition 1 and increases an amount of allocation of the disk control processor 104 to the logical partition 2. Consequently, it becomes possible to improve a utilization of the disk control processor 104 in the NAS.

Moreover, in the case in which the host system using the logical partition 1 does not require a high performance NAS, the file control hypervisor and the disk control hypervisor perform allocation processing so as to reduce the amounts of allocation of the file control processor 101 and the disk control processor 104 to the logical partition 1. Conversely, in the case in which the host system using the logical partition 1 requires a high performance NAS, the file control hypervisor and the disk control hypervisor perform allocation processing so as to increase the amounts of allocation of the file control processor 101 and the disk control processor 104 to the logical partition 1.

Figure 4:
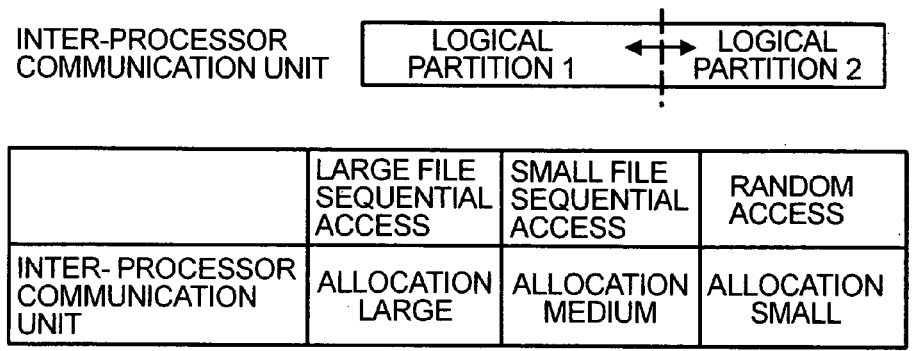
FIG. 4 is a diagram showing an example of allocation of an inter-processor communication unit.

FIG. 4 is a diagram showing an example of allocation of the inter-processor communication unit 103 to logical partitions. In the case in which an input/output request from a host system using the logical partition 1 is a request for a large file sequential access, the disk control hypervisor performs allocation processing so as to increase an amount of allocation of the inter-processor communication unit 103 to the logical partition 1 (more specifically, a communication bandwidth) and preserve data communication ability between the file control processor 101 and the disk control processor 104 (in other words, data communication ability between the host interface unit 100 to the cache memory 105).

In addition, if an input/output request of the host system using the logical partition 1 is a request for a small file sequential access, the amount of allocation of the inter-processor communication unit 103 to the logical partition 1 may not be large. Moreover, if a request from the host system is a request for a random access, performance of a virtual NAS of the logical partition 1 from the viewpoint of the host system is not significantly affected by the amount of allocation of the inter-processor communication unit 103 to the logical partition 1. Therefore, in these cases, the disk control hypervisor performs allocation processing so as to reduce the amount of allocation of the inter-processor communication unit 103 to the logical partition 1 and increase allocation thereof to the other logical partition (here, the logical partition 2) and improve utilization of the inter-processor communication unit 103 in the NAS.

Figure 5:
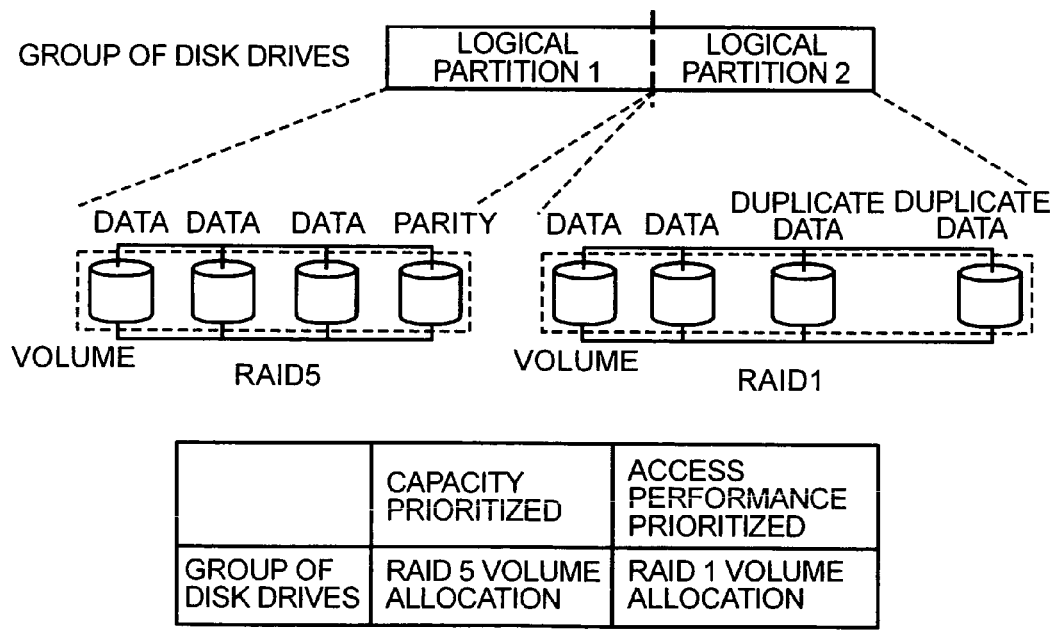
FIG. 5 is a diagram showing an example of allocation of groups of disk drives.

FIG. 5 is a diagram showing an example of allocation of the groups of disk drives 107 to logical partitions. If a host system using the logical partition 1 prefers large storage capacity, the disk control hypervisor allocates the groups of disk drives 701, which has a RAID 5 configuration with a high storage capacity efficiency (in FIG. 7, while the number of disk drives in which data is stored is three, the number of disk drives in which parity is stored is one, and a capacity efficiency is 75%), to the logical partition 1. In this case, a speed of rotation of a disk drive may not be so fast, for example, 7,500 rpm.

On the other hand, if the host system using the logical partition 1 prefers good access performance, the disk control hypervisor allocates the group of disk drives 701, which has a RAID1 configuration allowing accessibility to be improved (in FIG. 7, since identical data is duplicated and stored in two disk drives, a storage capacity efficiency is 50%, but since both the two disk drives can be used for the identical data, total accessibility is twice as high as that of one disk drive), to the logical partition 1. Note that, in this case, taking into account speeds of rotation of disk drives included in the group of disk drives 107 as well, the disk control hypervisor may allocate the group of disk drives 107 having a disk drive of a high rotation speed, for example, 15,000 rpm among the groups of disk drives 107 of the same RAID1 configuration to the logical partition 1.

Note that allocation of the host interface unit 100 to logical partitions is performed by the file control hypervisor according to performance required by a host system using the each logical partition. More specifically, in the case in which the performance required by the host system is high, the file control hypervisor allocates a large amount to a logical partition used by the host system, that is, high ability of communication with the host system (communication bandwidth, etc.). On the other hand, in the case in which the performance required by the host system is low or, in particular, there is no request, it is conceivable that the file control hypervisor allocates a small amount to a logical partition to be used by the host system, that is, low ability communication with the host system and improve efficiency of the entire NAS.

Figure 6:
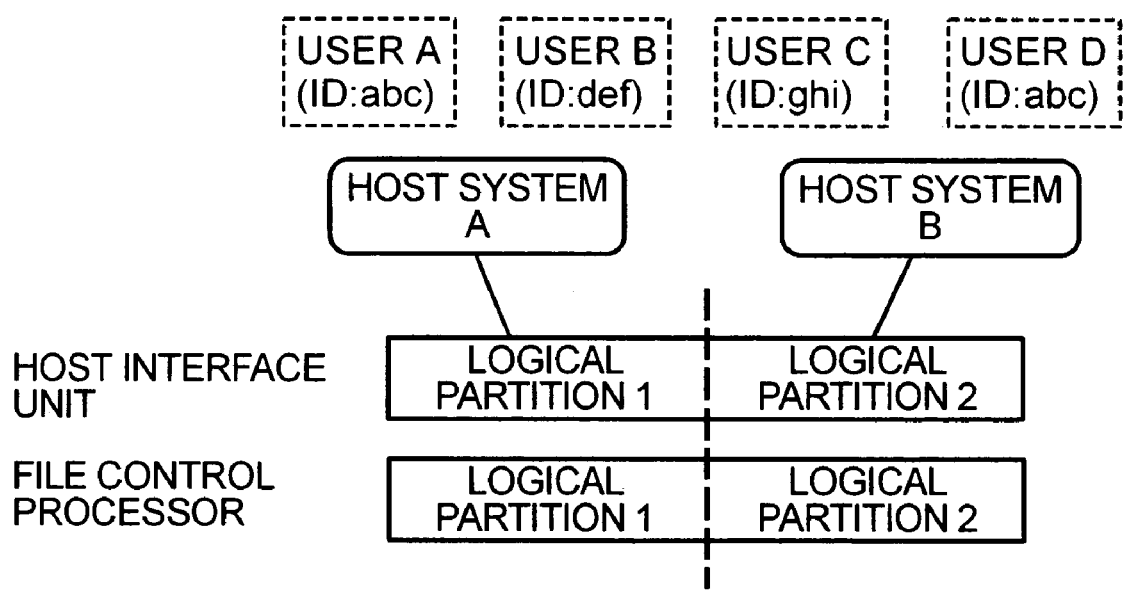
FIG. 6 is a diagram showing a concept of user authentication of a host system according to logical partitioning of a host interface unit and the file control processor.

Moreover, by logically partitioning to use one NAS as in this embodiment, it is possible to perform user authentication for a host system in the NAS independently by each logical partition. FIG. 6 is a diagram showing an example of the user authentication.

In this figure, a user A with an identifier (hereinafter referred to as "ID") "abc" and a user B with an ID "def" use a host system A which uses a logical partition 1, and a user C with an ID "ghi" and a user D with an ID "abc" use a host system B which uses a logical partition 2. In this case, the user A of the host system A and the user D of the host system B have the same ID "abc". Thus, in order to distinguish the user B and the user D in a conventional NAS, it has been necessary to perform special processing such as giving IDs to host systems or a group of host systems and combining the host ID and IDs of users to distinguish the users.

Figure 8:
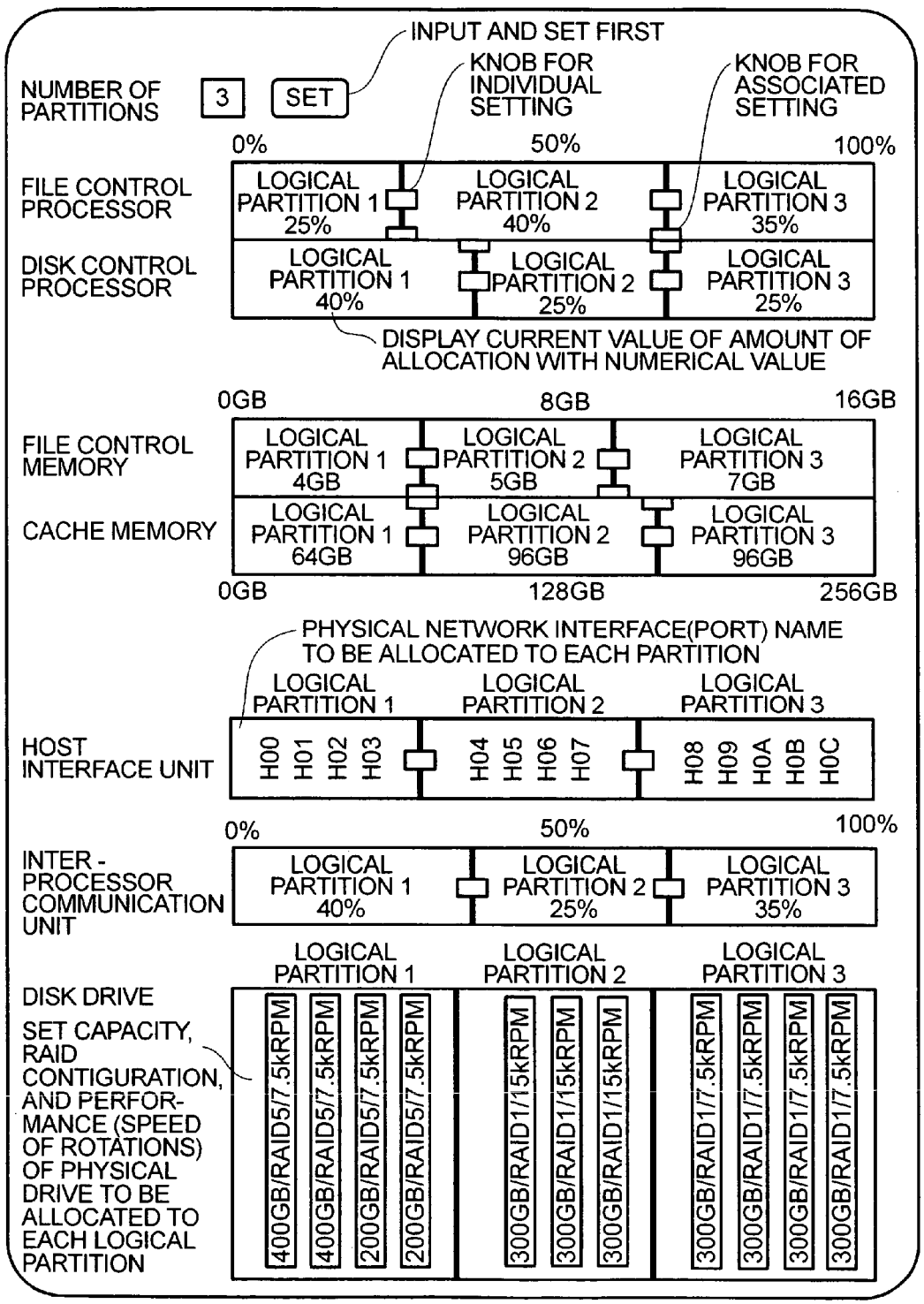
FIG. 8 is a diagram showing an example of a setting input screen for logical partitioning of the NAS.

However, in this embodiment, the host interface unit 100 and the file control processor 101 are logically partitioned, and the each logical partition operates as the host interface units 100 and the file control processors 101 of separate individual virtual NASs. Thus, user authentication is also performed independently for each logical partition. In other words, the user A and the user D having the identical "abc" in FIG. 8 are authenticated in the separate logical partitions respectively. Therefore, the user A and the user D are distinguished naturally, and no special processing is required in order to distinguish the users. In other words, as long as logical partitions are different, an identical ID can be given to plural users without performing special processing.

Moreover, resources of the host interfaces unit 100 and the file control processors 101 allocated to each logical partitions are never used in the other logical partitions. Thus, even if a user of a certain logical partition performs a large quantity of data access, users of the other logical partitions are never affected by that data access.

Next, a second embodiment will be described. A NAS of this embodiment includes processors of one type and memories of one type, in which the file control processors 101 and the disk control processors 104 of the NAS are integrated and the file control memories 102 and the cache memories 105 of the NAS are integrated.

Figure 7:
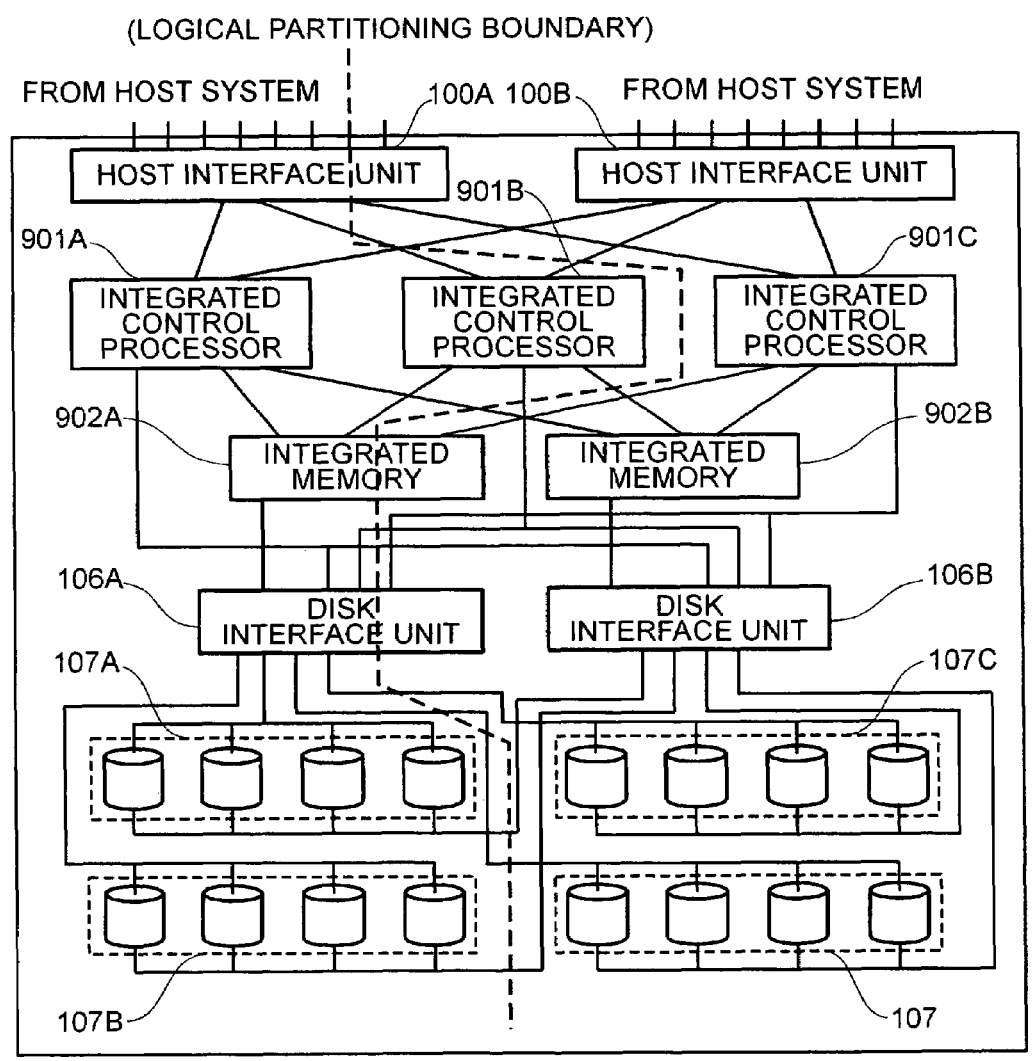
FIG. 7 is a diagram showing an example of a structure of a NAS.

FIG. 7 is a diagram showing an example of a structure of the second embodiment. In FIG. 7, integrated control processors 901 are processors in which the file control processors 101 and the disk control processors 104 are integrated, and integrated control memories 902 are memories in which the file control memories 102 and the cache memories 105 are integrated.

Compared with previously-mentioned embodiment (FIG. 1), in this embodiment, the inter-processor communication units 103 become unnecessary and the systems structure is simplified. In FIG. 7, both of processing for translating an input/output request by a unit of file from a host system into an input/output request of data and control of input/output of data between the disk interface units 106 and the groups of disk drives 107 are performed by the integrated processors 901. In addition, translation control information and data of the groups of disk drives 107 are stored in the integrated control memories 902. Structures and operations of the other portions in FIG. 7 are the same as those in FIG. 1.

In FIG. 7, as in FIG. 1, for example, processing is performed independently in logical partitions separated by a logical partition independently in logical partitions separated by a logical partition boundary as shown in FIG. 7. When the host interface units 100, the integrated control processors 901, the integrated control memories 902, the disk interface units 106, and the groups of disk drives 107, all of which are physical resources for processing allocated to the respective logical partitions, are allocated to each logical partition once, the devices are used solely for processing of the logical partition. In this way, the respective logical partitions operate as virtual NASs independent from each other.

The processing for logical partitioning and allocating the physical resources to the respective logical partitions is actually executed by the integrated control processors 901. The integrated control processors 901 perform control of the previously-mentioned integrated control hypervisor.

FIG. 8 is a diagram showing an example of a setting input screen of a supervising terminal for inputting setting of logical partitioning of a NAS. Such a setting input screen is used in both the first embodiment and the second embodiment. A supervisor or the like inputs setting for logical partitioning as shown in FIG. 8, and contents of the input of setting are notified to the NAS, whereby hypervisor operating in the NAS logically partitions the respective resources of the NAS.

More specifically, contents of input of setting are stored in a certain storage area provided in the NAS, and the hypervisor performs logical partitioning in accordance with the stored information.

More specifically, such a supervising terminal may be provided in a host system which has a connection to the NAS through a network. Or, the supervising terminal may be realized by a console device connected to the NAS by a special line. Such a control device can be realized by input device such as a keyboard and a display device such as a display.

Information inputted by the supervisor or the like is transferred to the NAS from the host system or the console device using a special purpose protocol or a general purpose protocol. The NAS has an interface for receiving the information (e.g., the host interface units 100 or a special purpose interface).

The setting input screen shown in FIG. 8 will be hereinafter described in detail. The screen includes a field in which the number of partitions of logical partitioning is inputted. The supervisor or the like inputs an intended number of partitions of logical partitioning in this field first (3 in the example in FIG. 8). When the supervisor or the like inputs the number of partitions of logical partitioning, logical partitions corresponding to the number are displayed on the screen for each physical resource, and an initial value of resource allocation to each logical partition is displayed.

Thereafter, the supervisor or the like inputs allocations of the resources such as processors or memories while looking at the screen. In this case, for example, in a part where allocation of the file control processor 101 and the disk control processor 104 is designated, if display is adapted such that ways of allocation of the respective processors to the respective logical partitions can be set in association with each other as shown in the figure (in the figure, both the processors are displayed side by side such that a relation between the processors can easily be seen), it becomes easy to input the setting for allocation control as described above with reference to FIG. 5.

In addition, for example, as shown in FIG. 8, not only knobs for setting amounts of allocation of the file control processor 101 and the disk control processor 104 to the logical partitions individually (icons which can be selected by a pointing device) but also knobs with which the amounts of allocation can be set in association with each other are prepared. Similarly, concerning the file control memory 102 and the cache memory 105, amounts of allocation of the memories to the respective logical partitions are displayed in association with each other, and knobs for individual setting and associated setting are prepared.

In the example of FIG. 8, concerning the inter-processor communication unit 103, the supervisor or the like inputs percentages of allocation of entire data transfer ability between the file control processor 101 and the disk control processor 104 (the host interface unit 100 and the cache memory 105) to the respective logical partitions.

In addition, concerning the host interface unit 100, the supervisor or the like inputs information on allocation by specifying a connection port of a network for physically connecting the host system rather than according to percentages of the resources. However, a method of inputting the information simply according to the percentages of the resources may be adopted. Moreover, concerning the group of disk drives 107, the supervisor or the like performs allocation of the resources by setting capacities, RAID constitutions, and performance (speed of rotations) of physical disk drives to be allocated to the respective logical partitions.

The above-mentioned methods of input of setting for resource allocation are examples. Other than these methods of input, allocation of resources may be inputted independently as numerical values or may be inputted automatically to some extent. For example, the supervisor or the like inputs characteristics of access which a host system requires of a certain logical partition (random or sequential, an average data length per one transfer, a minimum data transfer rate, a maximum response time, etc.) via a supervising terminal, whereby the supervisor or the like selects a set of parameters meeting the inputted characteristics with hypervisor, from several sets of parameters prepared in advance, more specifically, from sets of parameters having the characteristics shown in FIGS. 2 to 5.

Consequently, for example, in the case in which the supervisor or the like designates sequential access, the supervisor or the like selects a set of parameters corresponding to sequential (parameters corresponding to sequential shown in FIGS. 2 and 4) with hypervisor from the sets of parameters prepared in advance and sets the parameters to perform processing of logical partitioning.

More specifically, when the supervisor or the like wishes to create three logical partitions, namely, a logical partition suitable for a large file access, a logical partition suitable for small file access, and a moderate size file access, the supervisor or the like prepares partitioning parameters for a logical partition 1, in which an amount of allocation of a file control processor is smaller than an amount of allocation of a disk control processor, a logical partition 2, in which an amount of allocation of a file control processor is larger than an amount of allocation of a disk control processor, and a logical partition 3, in which amounts of allocation of a file control processor and a disk control processor are comparable, as described in the example of allocation setting of a file control processor and a disk control processor in FIG. 8, in an area referred to by the hypervisor (in a storage area in which information on allocation of resources to logical partitions described later in FIG. 9 is stored).

In actually performing allocation setting, the supervisor or the like simply designates characteristics which are requested of logical partitions such as the three logical partitions consisting of the logical partitions suitable for large file access, the logical partition for small file access, and the logical partition suitable for moderate file access. Then, the hypervisor automatically selects parameters for allocation corresponding to the designation.

Consequently, the supervisor or the like can easily designate logical partitions having desired performance and characteristics.

In addition, the supervisor or the like is required to make sure such that resources are sufficient for the each logical partition allowing it to operate correctly are always allocated by the input of allocation setting. For example, an amount of allocation of the file control processor or the disk control processor cannot be set to zero. At this point, in the automatic settings described above, it is also possible that a lower limit is set for an amount of allocated resources in advance such that this lower limit is complied with automatically. In addition, in the example of input as shown in FIG. 8, it is also possible that lower limits of amounts of allocation of the respective resources are defined in advance in the NAS and, in the case in which an amount of allocation of a resource below the lower limit for the resource is inputted, a warning is reported or such input of allocation is checked and refused.

Consequently, the supervisor or the like can set logical partitions safely.

FIG. 9 is an example showing information indicating the allocation of the resources to the logical partitions set by the supervisor or the like as described above. A correspondence relation between the physical resources and the logical partitions as shown in FIG. 9 is created on the basis of information that the hypervisor has received from the supervising terminal. More specifically, the respective parts of hypervisor have information on structures of the physical resources of the NAS, allocate the physical resources to the respective logical partitions on the basis of information inputted by the supervisor or the like and the information on the structure, and create the correspondence relations as shown in FIG. 9. Note that, in FIG. 9, the number of items on the vertical axis increases and decreases according to structures of devices provided in the NAS, and the number of logical partitions on the horizontal axis is changed according to designation by the supervisor or the like.

Then, the information on the correspondence relation as shown in FIG. 9 is stored in an area solely used by hypervisor of any one or more of the file control memories 102, the cache memories 105, the group of disk drives 107, and the other storage media as described above. The respective parts of hypervisor determine resources, which the respective logical partitions are caused to use, with reference to the stored information and perform processing for allocation of the resources.

In the storage according to the present invention, when the storage is shared by plural hosts, control for sharing can be reduced, and mutual interference among the hosts can be eliminated to guarantee performance of data input/output and localize data destruction or failure.

In addition, user authentication independent for each host or each group of hosts can be performed. Further, according to the present invention, it is possible to improve utilization of resources such as processors, memories, and storage media in a system.

Moreover, plural virtual NASs can be provided by one NAS. A degree of freedom of an operating system of a host can be improved. It is possible to independently perform operation and stop or failure processing. Thus, the NAS becomes advantageous in terms of system management, an installation area, power consumption, and so on.

Figure 10:
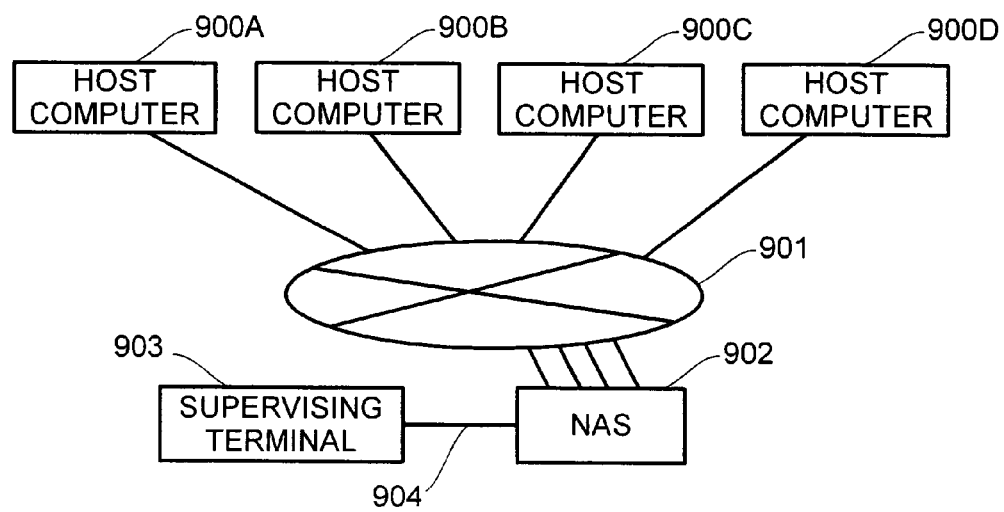
FIG. 10 is a diagram showing a NAS connected to a supervising terminal and to a host system through a network in one form.

FIG. 10 is an example of a form in which an NAS is connected to a host system (host computer). The NAS according to the present invention can also be used in the form of FIG. 10.

In FIG. 10, four host computers 900a to 900d are connected to an NAS 902 by a network 901. A supervising terminal 903 is connected to the NAS 902 by a special line 904. By using the special line 904, the supervising terminal 903 can be connected to the NAS 902 even if no settings are made in the NAS 902 in advance. When the NAS 902 is used for the first time, since no settings are made concerning a network, it is possible that the supervising terminal 903 is connected in the form as shown in FIG. 10.

Figure 11:
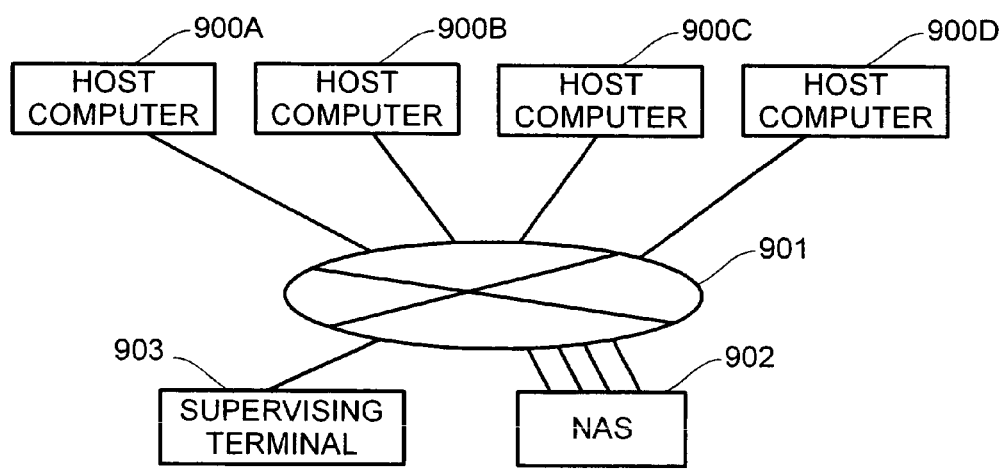
FIG. 11 is a diagram showing a NAS connected to a supervising terminal and to a host system through a network in another form.

On the other hand, FIG. 11 is an example of a form in which the supervising terminal 903 is also connected to the NAS 902 through the network 901 without providing a special line between the supervising terminal 903 and the NAS 902. In this case, settings concerning a network have to be made in the NAS 902 in order to communicate with the supervising terminal 903 through the network. If the network 901 is, for example, an IP network, settings for IP addresses of the NAS 902 itself and the supervising terminal 903 and the network masks are necessary.

It is possible that such settings concerning a network for communicating with the supervising terminal 903 are performed by, for example, connecting the supervising terminal 903 to the NAS 902 once through a special line in the form as shown in FIG. 10. When the settings for the network are completed, the connection by the special line between the supervising terminal 903 and the NAS 902 can be cancelled and removed, and the supervising terminal 903 can be connected to the network 901 to change the form to the form of FIG. 11, whereby the NAS 902 can be supervised from the supervising terminal 903 through the network.

Figure 12:
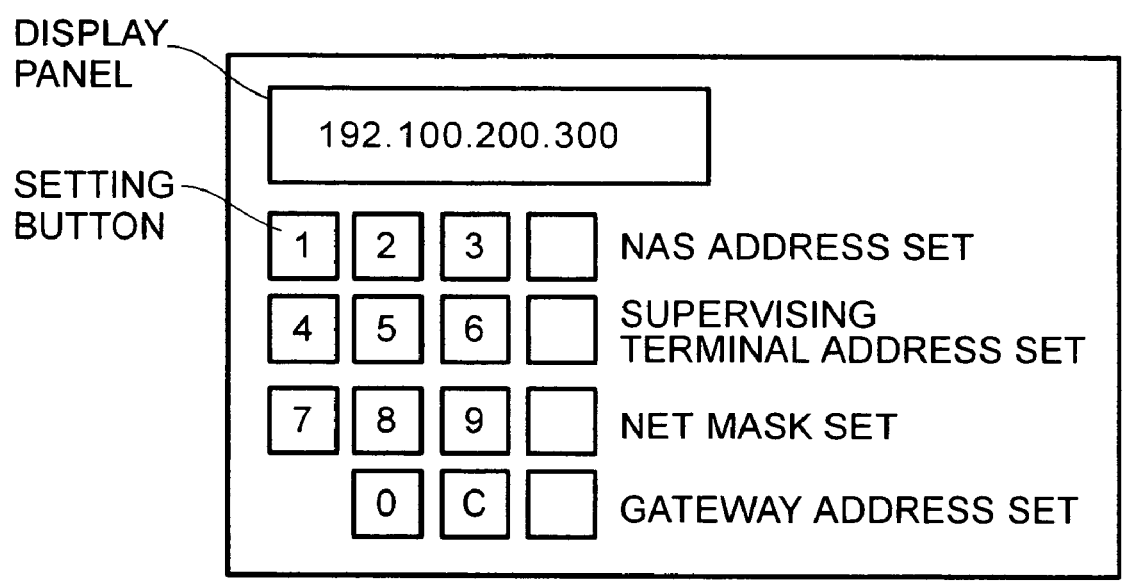
FIG. 12 is a diagram showing an example of a console unit for inputting network settings.

In addition, in FIG. 11, another method of performing the settings for the network for communicating with the supervising terminal 903 is to install a very small console unit for only performing the settings for the network in the NAS 902. FIG. 12 is an example of such a console unit. If the console unit as shown in FIG. 12 is provided on an appropriate surface of a housing of the NAS 902, the network settings for communicating with the supervising terminal 903 through the network 901 in the form as shown in FIG. 11 can be performed. If the supervising terminal 903 can be connected once through the network 901, supervising work for the NAS 902 after that can be performed through the supervising terminal 903.

In the NAS according to the present invention, plural virtual NASs operate on one physical NAS. For identifying the respective virtual NASs, settings are made in principle in network connection ports (host channels) of host interface units, which are allocated to the respective virtual NASs (logical partitions), such that the virtual NASs are identified by the network individually. For example, in the case in which the virtual NASs make connection through an IP network, different IP addresses have to be assigned to the respective host channels. Such identification settings for the network (assigning of IP addresses) can be performed by making connections between the supervising terminal and each of the virtual NASs operating in each logical partition. When the supervising terminal is connected to the physical NAS, for example, by a special line as shown in FIG. 10, it is possible to provide a special line as shown in FIG. 10, it is possible to provide a special switch on the supervising terminal side or the physical NAS side for switching the virtual NAS to be connected to the supervising terminal. For example, it is possible that such a switch is adapted such that currently operating virtual NASs are switched to be connected to the supervising terminal in turn every time the switch is pressed. On the supervising terminal side, it is also possible that such a special switch is substituted with some special sequence of normal key switches on the supervising terminal.

In addition, in the case in which the supervising terminal is connected through the network as shown in FIG. 11, identification settings for supervising (if the network is an IP network, assignments of IP addresses) different from identification settings of the network given to the host channels are performed in the NAS. In this case, first, the supervising terminal makes connection to the NAS using an IP address for supervision. Next, the special switch is provided such that currently operating virtual NASs are switched in turn every time the switch is pressed. Alternatively, it is also possible to prepare IP addresses for supervision by the number of virtual NASs (the number of logical partitions). in that case, it is unnecessary to provide a special switch, but it is necessary to prepare addresses of the network for supervision by the number of virtual NASs.

What is claimed is:

1. A storage to be connected to a network, comprising:
a host interface which is arranged to be connected to a host computer and the network and to receive file access from the host computer;

a plurality of disk drives; and
a control unit which translates data of the file access into block data and controls the plurality of disk drives on the basis of the block data, the control unit including a first processor which translates the data of file access into the block data, a second processor which controls the plurality of disk drives on the basis of the block data, and a disk interface which connects the plurality of disk drives;
wherein the control unit logically partitions into units the host interface, the first processor, the second processor, the disk interface, and the plurality of disk drives, allocating a logically-partitioned portion of each of the host interface, the first processor, the second processor, the disk interface, and the plurality of disk drives to each of the units, and causes the units to operate as a plurality of virtual storages independently.

2. The storage according to claim 1, wherein the control unit further includes a plurality of cache memories that temporarily store the block data from the second processor, and the plurality of cache memories is logically partitioned and allocated respectively to the plurality of virtual storages.

3. The storage according to claim 2, wherein the first processor executes a first hypervisor which performs the logical partitioning of the host interface and the first processor, and
wherein the second processor executes a second hypervisor which performs the logical partitioning of the plurality of cache memories, the disk interface, the plurality of disk drives and the second processor.

4. The storage according to claim 3, wherein the control unit further includes a plurality of memories which are used by the first processor and a plurality of communication units which connect the first processor and the second processor,
wherein the plurality of memories are logically partitioned by the first hypervisor and the plurality of communication units are logically partitioned by the second hypervisor.

5. The storage according to claim 2, wherein the first processor and the second processor execute a hypervisor which performs the logical partitioning of the host interface, the first processor, the plurality of cache memories, the second processor, the disk interface, and the plurality of disk drives.

6. The storage according to claim 2, wherein the control unit executes a hypervisor which performs the logical partitioning of the host interface, the first processor, the second processor, the cache memories, the disk interface, and the plurality of disk drives.

7. A storage to be connected to a network, comprising:
a host interface which is arranged to be connected to a host computer and the network and to receive file access from the host computer; and
a control unit which translates data of the file access into block data, the control unit including a first processor which translates the data of file access into the block data, a disk interface which is capable of being connected to a plurality of disk drives, and a second processor which controls the plurality of disk drives on the basis of the block data; logically partitions into units the host interface, the first processor, the second processor, and the disk interface, allocating a logically-partitioned portion of each of the host interface, the first processor, the second processor, and the disk interface to each of the units; and causes the units to operate as a plurality of virtual storages independently.

8. The storage according to claim 7, wherein the control unit further includes a plurality of cache memories that temporarily store the block data sent from the second processor, and the plurality of cache memories is logically partitioned and allocated respectively to the plurality of virtual storages.

9. The storage according to claim 8, wherein the first processor executes a first hypervisor which performs the logical partitioning of the host interface and the first processor, and
wherein the second processor executes a second hypervisor which performs the logical partitioning of the plurality of cache memories, the disk interface, and the second processor.

10. The storage according to claim 9, wherein the control unit further includes a plurality of memories which are used by the first processor and a plurality of communication units which connect the first processor and the second processor,
wherein the plurality of memories are logically partitioned by the first hypervisor and the plurality of communication units are logically partitioned by the second hypervisor.

11. The storage according to claim 8, wherein the first processor and the second processor execute a hypervisor which performs the logical partitioning of the host interface, the first processor, the plurality of cache memories, the second processor, the disk interface, and the plurality of disk drives.

12. The storage according to claim 8, wherein the control unit executes a hypervisor which performs the logical partitioning of the host interface, the first processor, the second processor, the cache memories, the disk interface, and the plurality of disk drives.

13. A storage system to be connected to host computers through a network, comprising:
one or more host interfaces which are configured to be connected to ones of the host computers through the network and to receive accesses from the host computers which designate data by a file type identification,
a plurality of disk drives,
one or more disk interfaces which connect the plurality of disk drives; and
one or more control units which first translate the accesses which designate data by the file type identification into the accesses which designate data by a logical volume number and a logical block address, and translate the logical volume number and the logical block address into a number which identifies one of the disk drives and a block address within the disk drive, then finally read data from or write data into the disk drive through the one of the disk interfaces,
wherein the control units logically partition into units the host interfaces, the control units themselves, the disk interfaces, and the plurality of disk drives, individually allocating a logically-partitioned control unit portion which translates an access which designates data by the file type identification into an access which designates data by the logical volume number and the logical block address and a logically-partitioned control unit portion which translates the logical volume number and the logical block address into a number which identifies one of the disk drives and the block address within the disk drive and reads data from or writes data into the disk drive through the one of the disk interfaces, and cause the units to operate as a plurality of virtual storage systems independently.

14. The storage according to claim 13, wherein the control unit further includes a plurality of cache memories that temporarily stores the data of the translated accesses sent from the control unit, and the plurality of cache memories is logically partitioned and allocated respectively to the plurality of virtual storage systems.

15. The storage according to claim 14, wherein the control unit further includes a processor that executes a first hypervisor which performs logical partitioning of the plurality of interfaces and the processor, and executes a second hypervisor which performs logical partitioning of the plurality of cache memories, the plurality of disk drives and the processor.

16. The storage system according to claim 15, wherein the control unit further includes a plurality of memories which is used by the processor and a plurality of communication units which connects the processor,
   wherein the plurality of memories is logically partitioned by the first hypervisor, and the plurality of communication units is logically partitioned by the second hypervisor.

17. The storage system according to claim 14, wherein the control unit executes a hypervisor which performs the logical partitioning of the plurality of interfaces, the control unit, the plurality of cache memories, and the plurality of disk drives.

18. The storage system according to claim 13, wherein the control unit executes a hypervisor which performs the logical partitioning of the plurality of interfaces, the control unit, and the plurality of disk drives.

* * * * *